United States Patent [19]

Yamashita et al.

[11] Patent Number: 5,705,898
[45] Date of Patent: Jan. 6, 1998

[54] LIGHTING CIRCUIT FOR DISCHARGE LAMP WHICH RESTRICTS INVERSION OF OUTPUT VOLTAGE POLARITY

[75] Inventors: Masayasu Yamashita; Atsushi Toda, both of Shimizu, Japan

[73] Assignee: Koito Manufacturing Co., Ltd., Tokyo, Japan

[21] Appl. No.: 645,408

[22] Filed: May 13, 1996

[30] Foreign Application Priority Data

May 12, 1995 [JP] Japan .................................. 7-137427

[51] Int. Cl.⁶ .................................................. G05F 1/00
[52] U.S. Cl. ................ 315/308; 315/151; 315/209 R; 315/82; 315/DIG. 5; 315/DIG. 7
[58] Field of Search ........................ 315/151, 158, 315/159, 82, 307, 308, 209 R, 224, DIG. 5, DIG. 7, 77, 219, 244, 360

[56] References Cited

U.S. PATENT DOCUMENTS

| | | | |
|---|---|---|---|
| 4,240,009 | 12/1980 | Paul | 315/224 |
| 4,587,460 | 5/1986 | Murayama et al. | 315/174 |
| 4,724,360 | 2/1988 | Luuresama | 315/244 |
| 5,068,570 | 11/1991 | Oda et al. | 315/360 |
| 5,140,229 | 8/1992 | Yagi et al. | 315/219 |
| 5,142,203 | 8/1992 | Oda et al. | 315/308 |
| 5,151,631 | 9/1992 | Oda et al. | 315/308 |
| 5,198,728 | 3/1993 | Bernitz et al. | 315/307 |
| 5,212,428 | 5/1993 | Sasaki et al. | 315/224 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/77 |
| 5,449,973 | 9/1995 | Yamashita et al. | 340/636 |
| 5,485,061 | 1/1996 | Ukita et al. | 315/307 |
| 5,486,740 | 1/1996 | Yamashita et al. | 315/308 |
| 5,491,387 | 2/1996 | Saito | 315/307 |
| 5,500,792 | 3/1996 | Jeon et al. | 363/98 |
| 5,514,935 | 5/1996 | Oda et al. | 315/82 |

FOREIGN PATENT DOCUMENTS

| | | |
|---|---|---|
| 35 39 119 | 12/1990 | Germany . |
| 40 33 664 | 5/1991 | Germany . |
| 41 36 486 | 5/1993 | Germany . |
| 44 42 658 | 7/1995 | Germany . |

*Primary Examiner*—Robert Pascal
*Assistant Examiner*—Haissa Philogene
*Attorney, Agent, or Firm*—Sughrue, Mion, Zinn, Macpeak & Seas, PLLC

[57] ABSTRACT

In a lighting circuit, a battery voltage is supplied via a DC booster circuit to a DC-AC converter where the voltage is converted to an AC voltage with a rectangular waveform. This AC voltage is supplied to a discharge lamp. At this time, the DC-AC converter controls the frequency of the rectangular wave output from the DC-AC converter in accordance with a signal sent to a bridge type driver from a frequency controller. A lighting detector is provided to detect if the discharge lamp has been lighted. Upon reception of a signal from the lighting detector, the frequency controller sets the frequency of the output voltage of the DC-AC converter in the pre-lighting period of the discharge lamp higher than the frequency of the output voltage of the DC-AC converter after the lighting of the discharge lamp and restricts the inversion of the polarity of the output voltage of the DC-AC converter until a predetermined time passes sfrom the point of the activation of the discharge lamp.

20 Claims, 8 Drawing Sheets

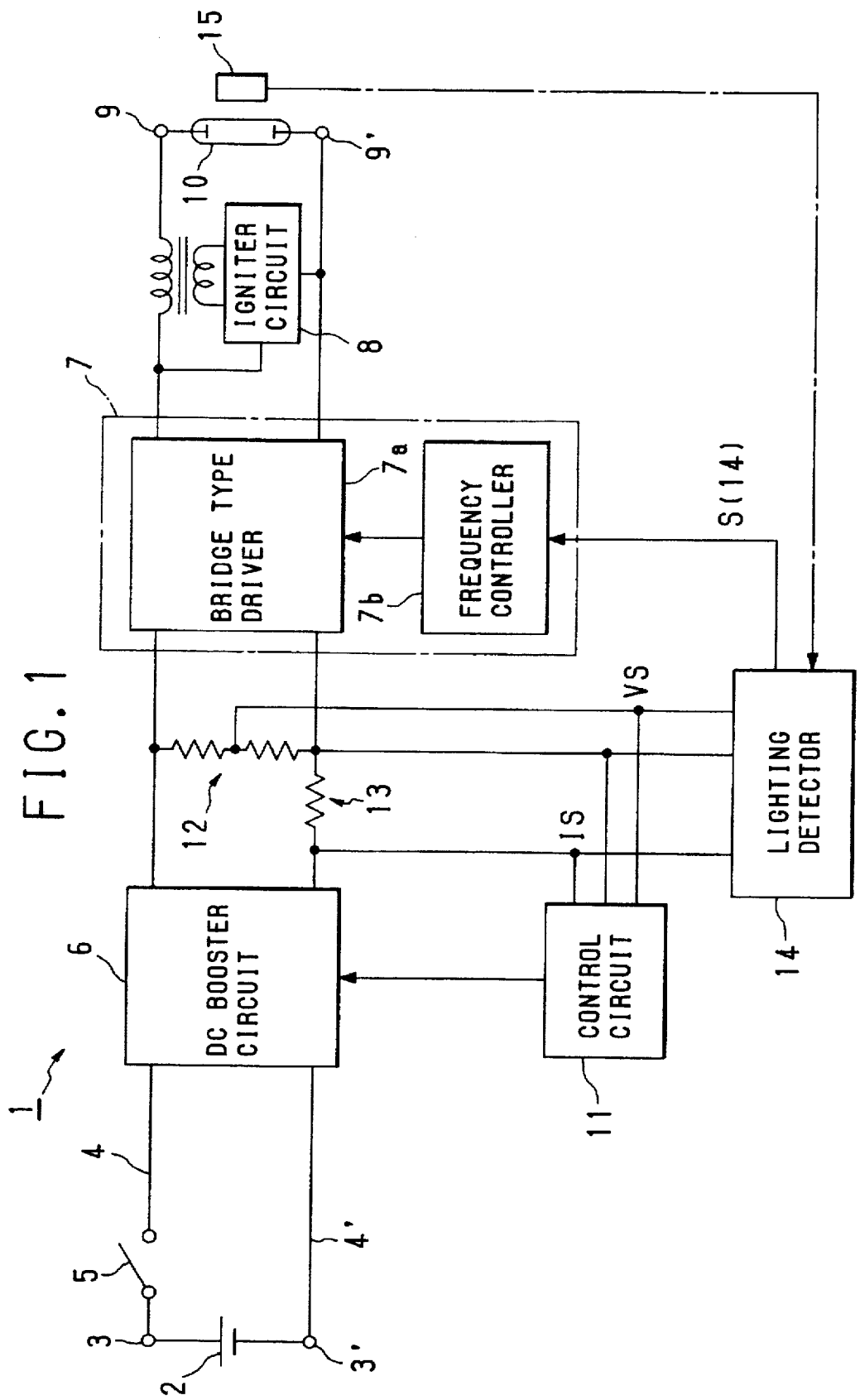

LIGHTING CIRCUIT FOR DISCHARGE LAMP WHICH RESTRICTS INVERSION OF OUTPUT VOLTAGE POLARITY

BACKGROUND OF THE INVENTION

1. Field of the Invention

The present invention relates to a novel lighting circuit for a discharge lamp, which alters the frequency of an AC voltage to be applied to the discharge lamp between before and after the activation of the discharge lamp, and restricts the inversion of the polarity of the AC voltage in the frequency switching period, thereby ensuring stable lighting of the discharge lamp without enlarging the lighting apparatus and significantly increasing the manufacturing cost thereof.

2. Description of the Related Art

Recently, a compact metal halide lamp is receiving greater attention as a light source which takes the place of an incandescent lamp. To adapt this lamp to the light source for a vehicular lamp, it is important to consider how to quickly increase the flux of light from the lamp.

As one known way to accomplish it, preparation of light by pre-heating or low power is performed when the lamp is not lighted, thus shortening the time needed for the light from the lamp to reach a predetermined brightness from the beginning of the lighting of the lamp.

FIG. 8 illustrates the simplified structure of a lighting circuit a which is designed to switch one inductor to another. As illustrated, two inductors c1 and c2 are connected in series on the power supply path from an AC power supply b to a discharge lamp d, and a switch e is connected in parallel to the inductor c1. The switch e is open before the activation of the lamp d and is closed at the time of activating the lamp d. This switching action can alter the inductance and can thus shorten the time to activate the discharge lamp.

Because this method which alters the inductance by using the inductors c1 and c2 requires a large overall inductance, it hinders the downsizing of the lighting apparatus and the reduction of the manufacturing cost thereof.

At the time the polarity of the waveform of the output of a lighting circuit changes, there are points where the lamp current of a discharge lamp zero-crosses. In the period soon after the activation of the discharge lamp, the discharge lamp is still unstable and the polarity of the output of the lighting circuit may not invert successfully at the zero-cross points of the lamp current, thus causing a lighting failure.

SUMMARY OF THE INVENTION

Accordingly, it is an objective of the present invention to provide a lighting circuit for a discharge lamp, which changes the frequency of an AC voltage to be supplied to the discharge lamp between before and after the lighting of the discharge lamp and restricts the inversion of the polarity of the AC voltage in the frequency switching period, thus ensuring quick and stable lighting of the discharge lamp.

To achieve this object, according to this invention, a lighting circuit for a discharge lamp having DC-AC converting means for converting a DC voltage to an AC voltage which is to be supplied to the discharge lamp via an inductive load, comprises lighting detection means for detecting if the discharge lamp is lighted; and frequency control means for, upon reception of a signal from the lighting detector, setting a frequency of an output voltage of the DC-AC converting means after activation of the discharge lamp higher than a frequency of the output voltage of the DC-AC converting means in a non-lighting period of the discharge lamp, and restricting inversion of a polarity of the output voltage of the DC-AC converting means until a predetermined time passes after a point of activation of the discharge lamp.

According to the lighting circuit for a discharge lamp which embodies this invention, the frequency of the output voltage of the DC-AC converting means is set low in the non-lighting period and the inversion of the polarity of the put voltage of the DC-AC converting means is restricted until a predetermined time passes after the point of the activation of the discharge lamp at the time of increasing the frequency of the output voltage of the DC-AC converting means in order to prevent the light-ON state of the discharge lamp from becoming unstable due to a rapid change in the frequency.

BRIEF DESCRIPTION OF THE DRAWINGS

FIGS. 1 through 5 illustrate a lighting circuit according to the first embodiment of the present invention.

FIG. 1 is a block diagram showing the circuit structure of the lighting circuit according to the first embodiment;

FIG. 3 is a circuit diagram exemplifying the structure of a bridge type driver of a DC-AC converter;

FIG. 4 is a circuit diagram exemplifying the structure of a frequency controller of the DC-AC converter; and FIG. 5 is a time chart for explaining the operation of the frequency controller.

FIG. 6 is a circuit diagram showing the structure of a frequency controller according to the second embodiment; and FIG. 7 is a time chart for explaining the operation of this frequency controller.

DETAILED DESCRIPTION OF THE PREFERRED EMBODIMENTS

Figure 2A:
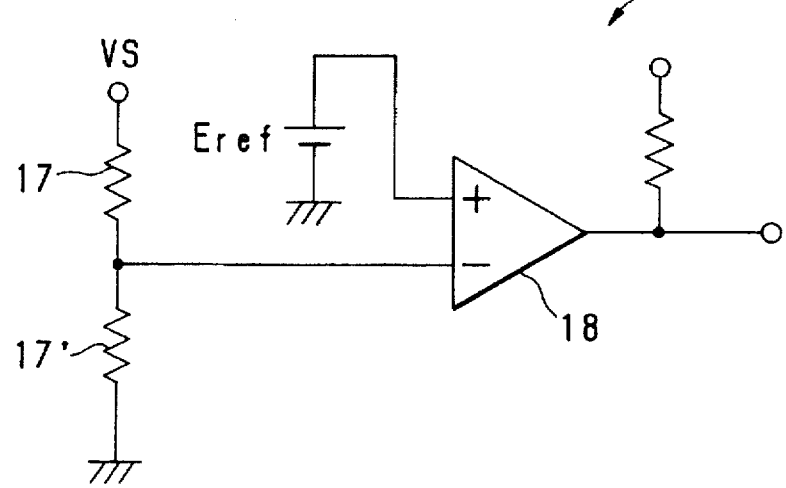
FIG. 2A shows the structure of one example of a lighting detector, which uses a voltage detection signal VS.

Lighting circuits for a discharge lamp according to preferred embodiments of the present invention will be now described in detail with reference to the accompanying drawings. In the illustrated embodiments, this invention is adapted for a lighting circuit of a square-wave triggered AC lighting system.

FIGS. 1 through 5 illustrate a lighting circuit 1 according to the first embodiment of this invention, which is designed to alter the frequency of an AC voltage to be supplied to a discharge lamp between before and after the activation of the discharge lamp and restrict the inversion of the polarity of the AC voltage in the frequency switching period. It is therefore possible to turn on the discharge lamp quickly and stably.

The lighting circuit 1 has a battery 2, connected between DC voltage input terminals 3 and 3'. There are two DC power lines 4 and 4', and a lighting switch 5 is provided on the positive DC power line 4.

A DC booster circuit 6 is provided to boost or reduce the battery voltage and is controlled by a control circuit which will be discussed shortly after.

A DC-AC converter 7, provided at the subsequent stage of the DC booster circuit 6, converts a DC voltage sent from the DC booster circuit 6 to a square-wave AC voltage. This DC-AC converter 7 comprises a bridge type driver 7a and a frequency controller 7b. The bridge type driver 7a is provided on the power supply path to the discharge lamp. The frequency controller 7b serves to control the rectangular-wave frequency output from the bridge type driver 7a.

An igniter circuit 8 is provided at the subsequent stage of the DC/AC converter 7. A discharge lamp 10 is connected between AC output terminals 9 and 9' of the igniter circuit 8. It is to be noted that a metal halide lamp having the rated power of, for example, 35 W is used as the discharge lamp 10.

A control circuit 11 controls the output voltage of the DC booster circuit 6. This control circuit 11 is supplied with a detection signal (indicated by "VS") equivalent to the output voltage of the DC booster circuit 6, which is detected by a voltage detector 12 provided between the output terminals of the DC booster circuit 6. A current detector 13 is provided on the ground line which connects the DC booster circuit 6 to the DC-AC converter 7. This current detector 13 sends a current detection signal (indicated by "IS") corresponding to the output current of the DC booster circuit 6 to the control circuit 11 after voltage conversion. The control circuit 11 generates control signals according to those detection signals and sends the detection signals to the DC booster circuit 6 to control the output voltage thereof. Accordingly, the control circuit 11 performs power control which matches with the status of the discharge lamp 10, thereby shortening the activation time and the re-activation time of the discharge lamp 10 and ensuring the stable lighting control of the discharge lamp 10 in the steady light-ON state.

A lighting detector 14 detects if the discharge lamp 10 is lighted. The methods of detecting the lighting state of the discharge lamp 10 include a method of monitoring signals equivalent to the lamp voltage and the lamp current of the discharge lamp 10, from the voltage detector 12 and the current detector 13, or a method of directly detecting the light irradiated from the discharge lamp 10 by means of a photosensor 15.

FIG. 2A exemplifies a circuit 16 which monitors the detection signal VS from the voltage detector 12 to detect the light-ON state or the light-OFF state of the discharge lamp 10. The detection signal VS is voltage-divided by voltage-dividing resistors 17 and 17'. The resultant signal is sent to the negative input terminal of the comparator 18 to be compared with a reference voltage Eref which is supplied to the positive input terminal of the comparator 18. In other words, when the voltage-divided level of the detection signal VS is lower than the reference voltage Eref, it is detected what the discharge lamp 10 has been lighted, and the comparator 18 outputs an H (High)-level signal.

Figure 2B:
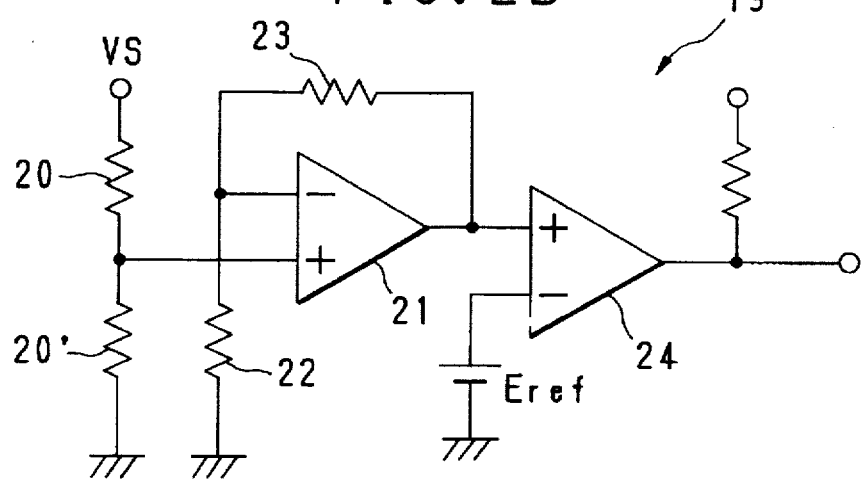
FIG. 2B shows the structure of another example of the lighting detector, which uses a current detection signal IS.

FIG. 2B shows a circuit 19 which monitors the detection signal IS from the current detector 13 to detect the light-ON state or the light-OFF state of the discharge lamp 10. The detection signal IS is voltage-divided by voltage-dividing resistors 20 and 20'. The resultant signal is sent to the non-inverting input terminal of an operational amplifier 21 which constitutes a differential amplifier circuit. The inverting input terminal of the operational amplifier 21 is grounded via a resistor 22 and is connected via a feedback resistor 23 to the output terminal of this amplifier 21. The output of the operational amplifier 21 is sent to the positive input terminal of a comparator 24, located at the subsequent stage, to be compared with a reference voltage Eref which is supplied to the negative input terminal of the comparator 24. That is, when the amplified voltage level of the detection signal IS is higher than the reference voltage Eref, it is detected that the discharge lamp 10 has been lighted, and the comparator 24 outputs an H-level signal.

Figure 2C:
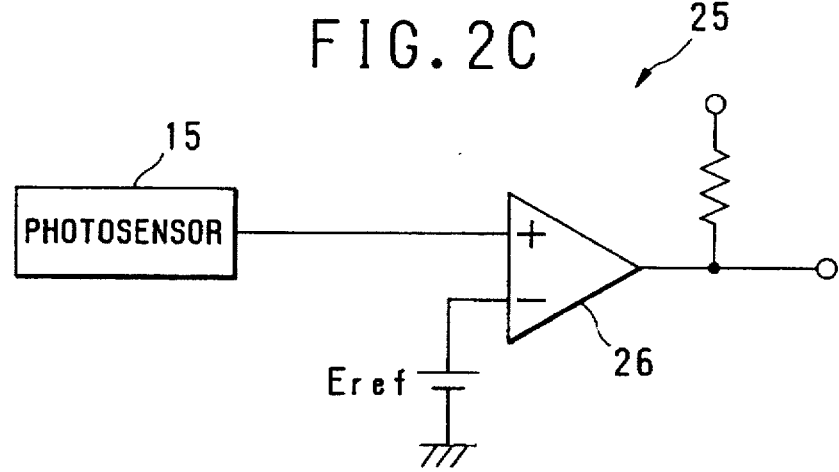
FIG. 2C shows the structure of a further example of the lighting detector, which uses a detection signal from a photosensor.

FIG. 2C shows a circuit 25 which monitors the output signal of the photosensor 15 to detect the light-ON state or the light-OFF state of the discharge lamp 10. The detection signal from the photosensor 15 is sent to the positive input terminal of a comparator 26 where it is compared with a reference voltage Eref supplied to the negative input terminal of the comparator 26. More specifically, when the voltage level of the detection signal from the photosensor 15 is higher than the reference voltage Eref, it is detected that the discharge lamp 10 has been lighted, and the comparator 26 sends out an H-level signal.

As the voltage detection signal VS and the current detection signal IS, which are equivalent to the lamp voltage and lamp current of the discharge lamp 10, are input to the control circuit 11 in the lighting circuit 1 in the examples illustrated in FIGS. 2A and 2B, those equivalent signals are also used to detect the light-ON state of the discharge lamp 10. It should be however noted that the lamp voltage and lamp current of the discharge lamp 10 could be directly detected at the subsequent stage of the DC-AC converter 7.

The output signal of the lighting detector 14 is sent to the frequency controller 7b and to an unillustrated protection circuit or the like to be used as reference information to determine the circuit conditions.

Figure 3:
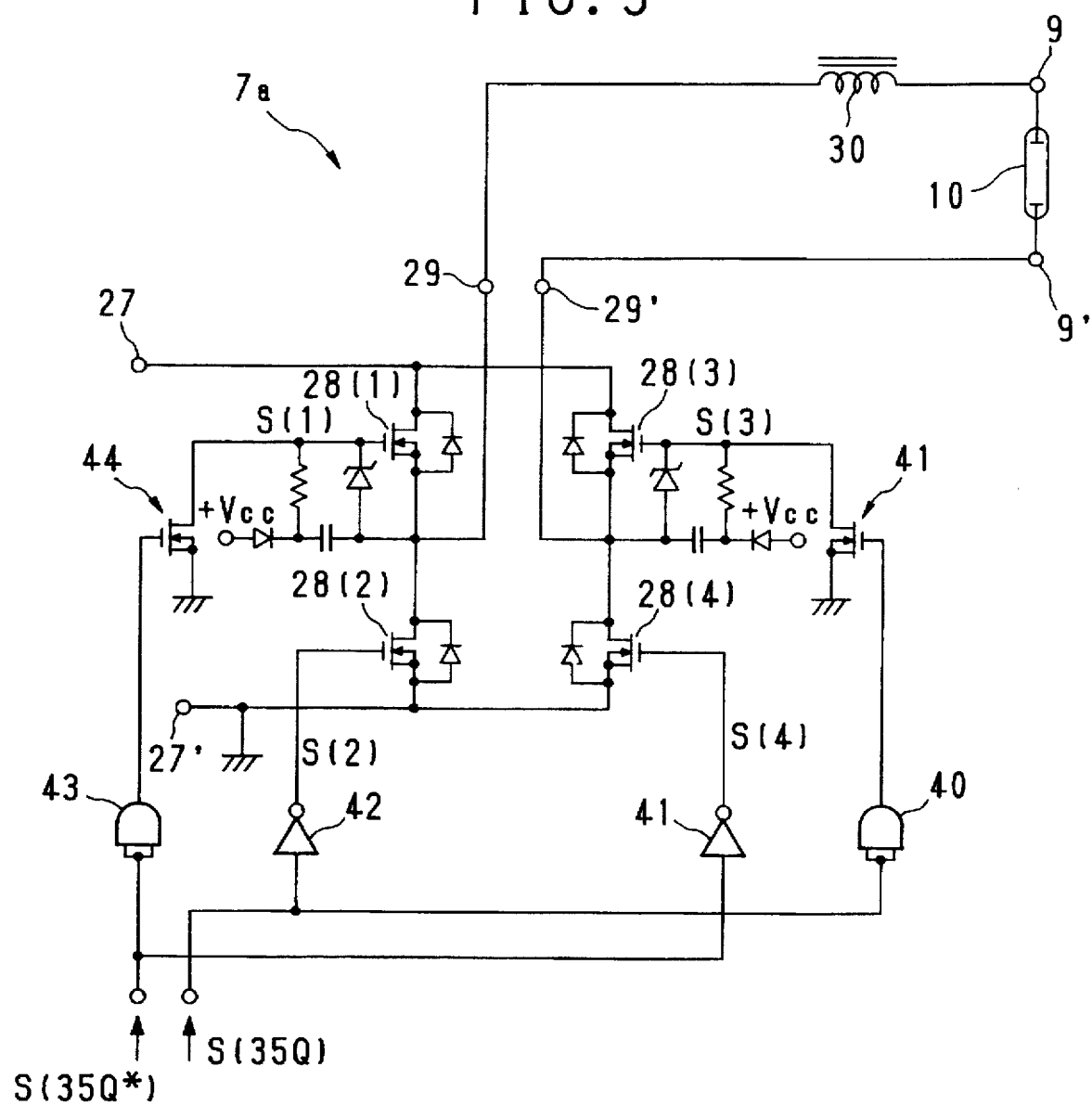

FIG. 3 exemplifies the structure of the bridge type driver 7a of the DC-AC converter 7, which takes the two-stage bridge structure using FETs, for example. The switching control of the FETs is executed by a control signal sent to the FETs from the frequency controller 7b.

Reference number "27" denotes a DC voltage input terminal or a positive input terminal and reference number "27'" denotes another DC voltage input terminal or a ground input terminal. The output voltage of the DC booster circuit 6 is applied to those input terminals 27 and 27'.

The bridge type driver 7a is comprised of four N channel FETs 28(i) (i=1, 2, 3, 4). The FETs 28(1) and 28(2) are connected in series, and the FETs 28(3) and 28(4) are connected in series. Those two series circuits of FETs are arranged in parallel to each other. More specifically, the FET 28(1) at the upper stage has a drain connected to the positive input terminal 27 and a source connected to the drain of the lower-stage FET 28(2) whose source is connected to the ground input terminal 27'.

With regard to the FETs 28(3) and 28(4) arranged in parallel to the FETs 28(1) and 28(2), the upper-stage FET 28(3) has a drain connected to the positive input terminal 27 and a source connected to the drain of the lower-stage FET 28(4) whose source is connected to the ground input terminal 27'.

A Zener diode is inserted between the gate and source of the FET 28(1) and another Zener diode is likewise inserted between the gate and source of the FET 28(3), with a capacitor and a resistor provided between the anode of each Zener diode and the gate of the associated FET. A predetermined voltage (Vcc) is applied between each pair of the capacitor and resistor via a diode.

An output terminal 29 is connected to the source of the FET 28(1), and an output terminal 29' is connected to the source of the FET 28(3), so that a square-wave output voltage is applied to the discharge lamp 10 via an inductor 30.

The inductor 30 is equivalent to the secondary winding of a trigger transformer (not shown) which is provided in the igniter circuit 8 to generate an activation pulse to the discharge lamp 10.

With regard to the switching control of the FETs 28(i) (i=1, 2, 3, 4), control signals S(i) (i=1, 2, 3, 4) are sent to the individual FETs from the frequency controller 7b in such a way as to complimentarily control two sets of the obliquely arranged FETs.

The frequency controller 7b is designed in such a manner as to generate different control signals in three periods, namely, the period in which the discharge lamp 10 is lighted from the beginning of the activation (hereinafter called "pre-lighting period"), the period from the lighting of the discharge lamp 10 to the point of the passage of a predetermined time (hereinafter called "polarity-inversion restricting period"), and the period after the polarity-inversion restricting period passes (hereinafter called "restriction release period"). More specifically, the frequency controller 7b generates a square-wave signal with a low frequency in the prelighting period, then generates a DC signal with a predetermined polarity in the polarity-inversion restricting period, and generates a square-wave signal with a high frequency in the subsequent restriction release period.

Figure 4:
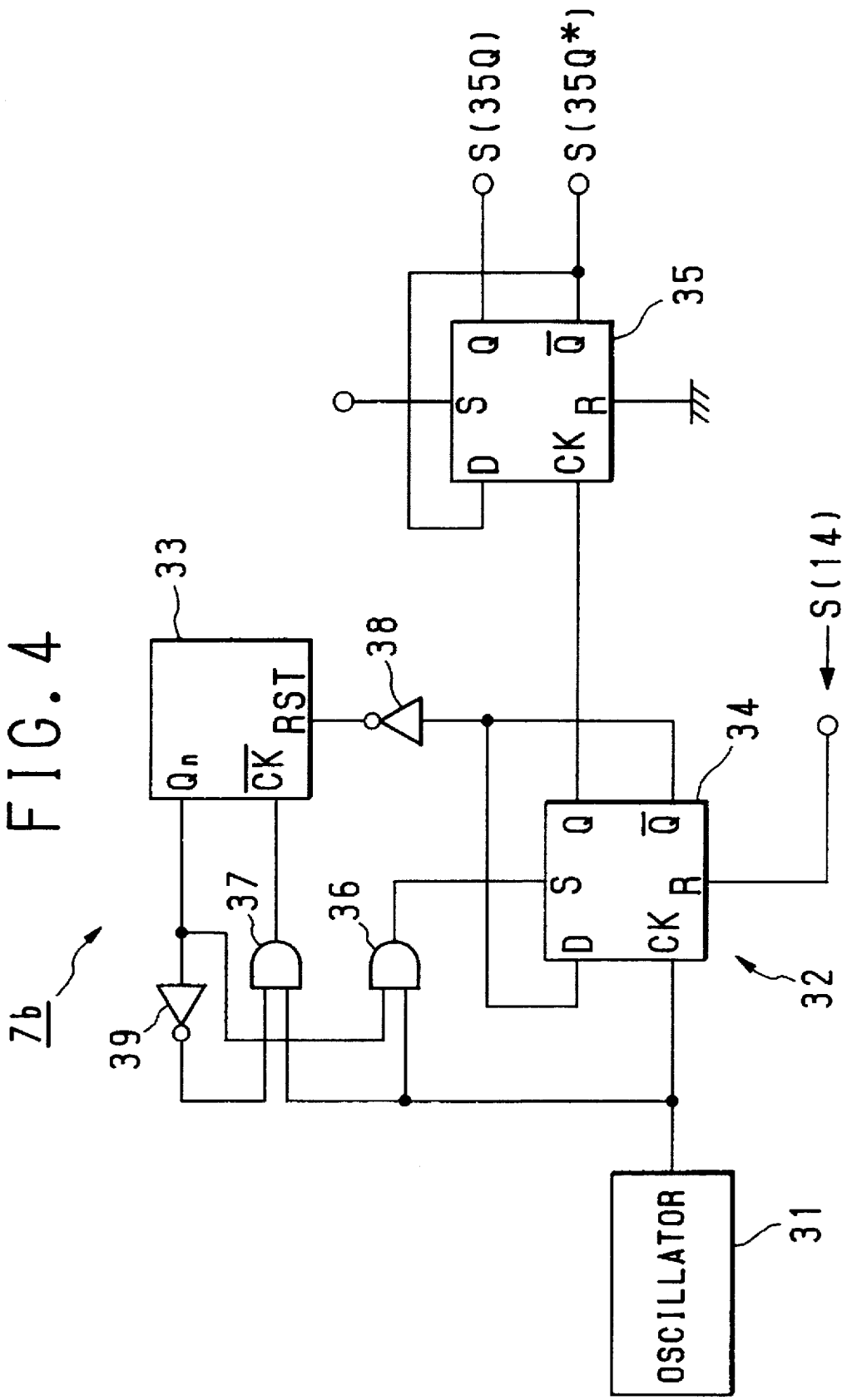

The frequency controller 7b comprises an oscillator 31 and a frequency divider 32 as shown in FIG. 4.

The oscillator 31 generates a clock signal with a basic frequency (fo), and has the structure of an astable multivibrator using a NOT gate.

The frequency divider 32 has a counter 33, two D type flip-flops 34 and 35 and several logic gates.

As illustrated, the clock signal output from the oscillator 31 is input to the clock input terminal (CK) of the flip-flop 34 and to one input terminal of each of two-input AND gates 36 and 37. The output signal of the AND gate 36 is sent to the set terminal (S) of the flip-flop 34, and the output signal of the AND gate 37 is sent to the negative edge clock input terminal (/CK) of the counter 33.

The output signal (S(14)) of the aforementioned lighting detector 14 is sent to the reset terminal (R) of the flip-flop 34. The D terminal (D) of the flip-flop 34 is connected to the /Q terminal thereof, one of the output terminals.

The Q output of the flip-flop 34 is sent to the clock input terminal (CK) of the flip-flop 35 at the subsequent stage, and the /Q output (inverted Q output) of the flip-flop 34 is sent to the reset terminal (RST) of the counter 33 via a NOT gate 38.

The n-bit output terminal (Qn) of the counter 33 is connected to the remaining input terminal of the AND gate 36 and to the remaining input terminal of the AND gate 37 via a NOT gate 39. Therefore, the AND signal of the output signal of the counter 33 and the clock signal of the oscillator 31 becomes a set signal to the flip-flop 34, and the AND signal of the inverted output signal of the counter 33 and the clock signal of the oscillator 31 becomes a clock input signal to the counter 33.

The flip-flop 35 has its D terminal (D) connected to its /Q terminal. As shown in FIG. 3, the Q output of the flip-flop 35 (which is indicated by "S(35Q)") is sent to the gate of the FET 28(3) via a buffer 40 and FET 41, and to the gate of the FET 28(2) via a NOT gate 42. The /Q output of the flip-flop 35 (which is indicated by "S(35Q*)") is sent to the gate of the FET 28(1) via a buffer 43 and FET 44, and to the gate of the FET 28(4) via a NOT gate 45, as shown in FIG. 3. Accordingly, the set of the FETs 28(2) and 28(3) and the set of the FET 28 (1) and 28(4) are complimentarily switched.

Figure 5:
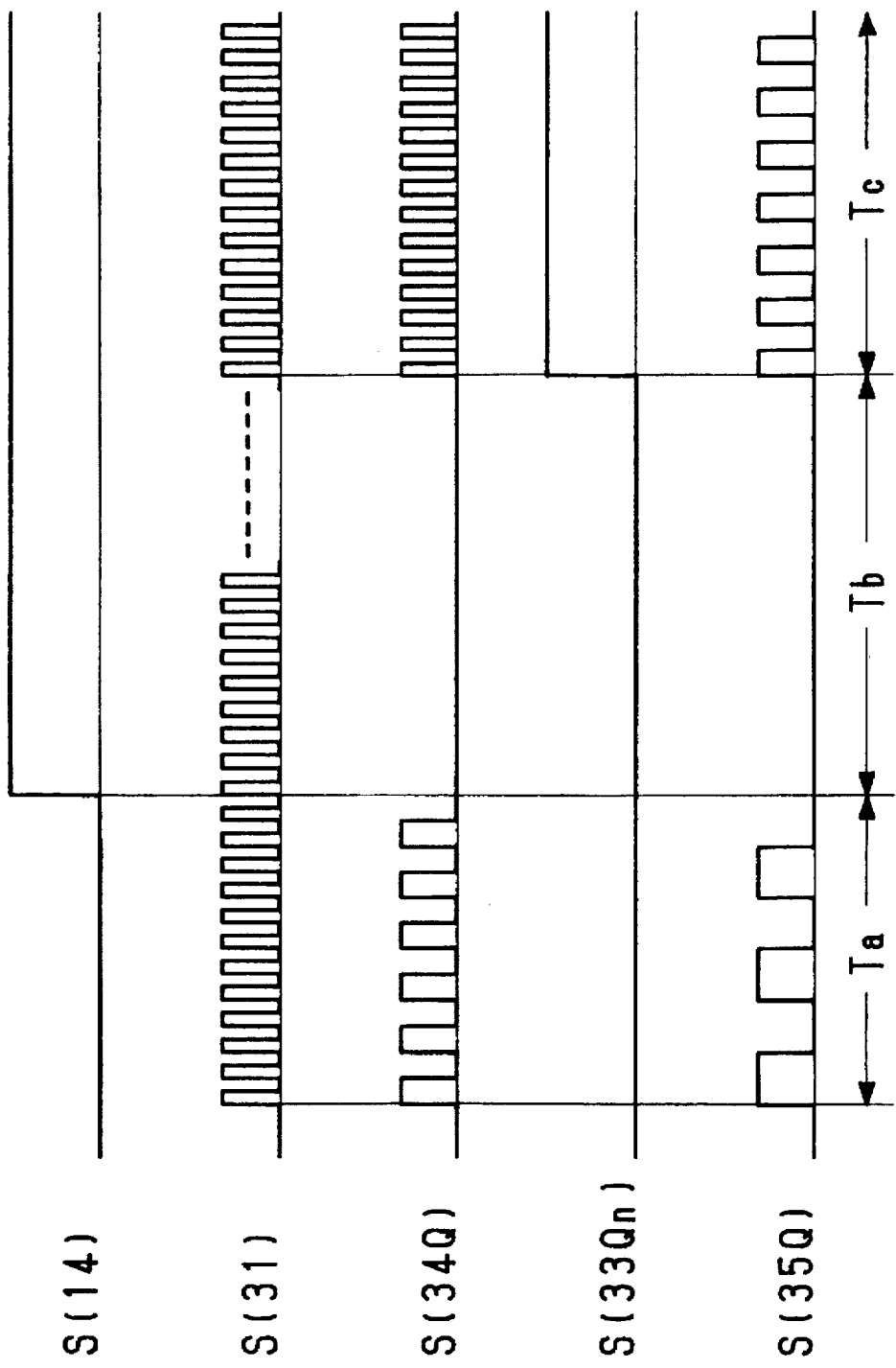

FIG. 5 presents a time chart illustrating the operations of the individual sections of the frequency controller 7b. In the diagram, "S(31)" denotes the clock signal generated from the oscillator 31, "S(34Q)" shows the Q output of the flip-flop 34, and "S(33Qn)" indicates the Qn output signal of the counter 33. "S(14) and "S(35Q)" respectively represent the output signal of the lighting detector 14 and the Q output of the flip-flop 35, as mentioned above. "Ta" indicates the pre-lighting period, "Tb" indicates the polarity-inversion restricting period and "Tc" indicates the restriction release period.

In the pre-lighting period Ta, the signal S(14) has a low (L) level, and the clock signal S(31) is frequency-divided by the flip-flop 34 and is further frequency-divided by the flip-flop 35. The output signal of the flip-flop 35 therefore has the reference frequency of fo/4. Since the /Q output of the flip-flop 34 is sent via the NOT gate 38 to the reset terminal of the counter 33, the counter 33 is occasionally reset to disable the count-up operation.

In the next polarity-inversion restricting period Tb, when the lighting detector 14 detects the lighting of the discharge lamp 10 and its output signal S(14) becomes an H level, the flip-flop 34 is reset to stop functioning. As a result, the /Q output of the flip-flop 34 becomes an H level so that the signal to be supplied to the reset terminal of the counter 33 via the NOT gate 38 becomes an L level, permitting the count-up action of the counter 33. That is, the polarity-inversion restricting period Tb (=2^(n−1) /fo where "^" means the power) is equivalent to the period from the end of the counting operation to the point when the Qn output signal S(33Qn) of the counter 33 becomes an H level, and the flip-flops 34 and 35 both stop operating during this period.

When the polarity-inversion restricting period Tb passes, the Qn output signal S(33Qn) of the counter 33 becomes an H level and the AND signal of this Qn output signal and the clock signal S(31) is sent to the set terminal of the flip-flop 34. Therefore, the clock signal S(31) passes through the flip-flop 34 and reaches the flip-flop 35. As a result, the basic frequency of the output of the flip-flop 35 in the restriction release period Tc becomes fo/2, which is higher than the basic frequency in the pro-lighting period Ta. It is to be noted that the Qn output signal S(33Qn) of the counter 33 is inverted to an L-level signal by the NOT gate 39, and the AND signal of this L-level signal and the clock signal S(31) becomes an L level, inhibiting the supply of the clock signal to the counter 33.

As apparent from the above, the basic frequency of the rectangular wave output from the DC-AC converter 7 in the restriction release period Tc is higher than that in the pre-lighting period Ta, and the provision of the polarity inversion restricting period Tb between both periods Ta and Tc ensures stable lighting. If the frequency drastically changes from that of the pro-lighting period Ta to that of the restriction release period Tc, the polarity of the frequency may not be properly inverted at the zero-cross points of the lamp current, thus causing a lighting failure. As the pre-lighting period Ta is changed to the restriction release period Tc via the polarity-inversion restricting period Tb, however, the frequency of occurrence of such a lighting failure can be reduced.

Figure 6:
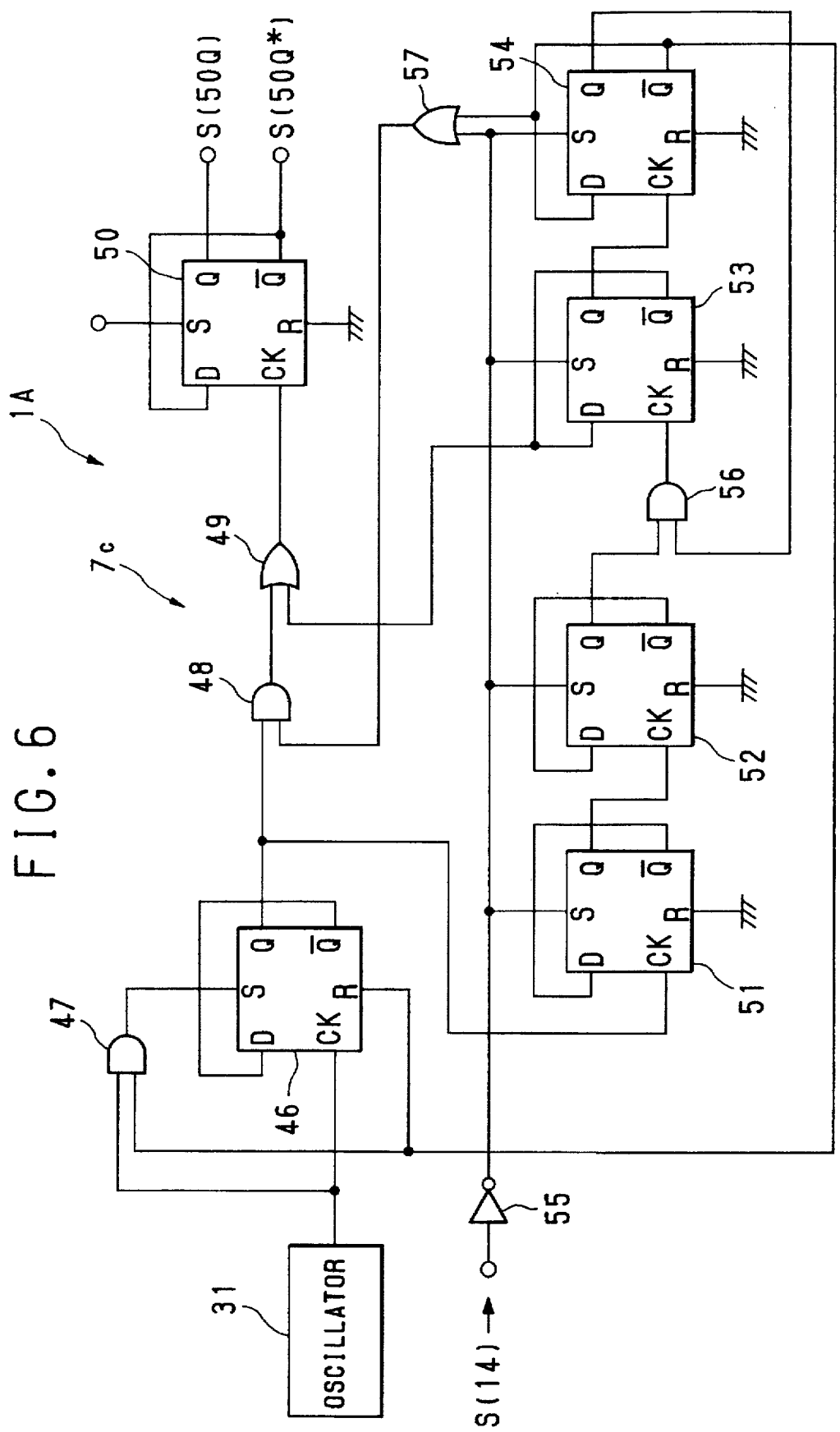
FIGS. 6 and 7 illustrate a lighting circuit according to the second embodiment of this invention.
Figure 7:
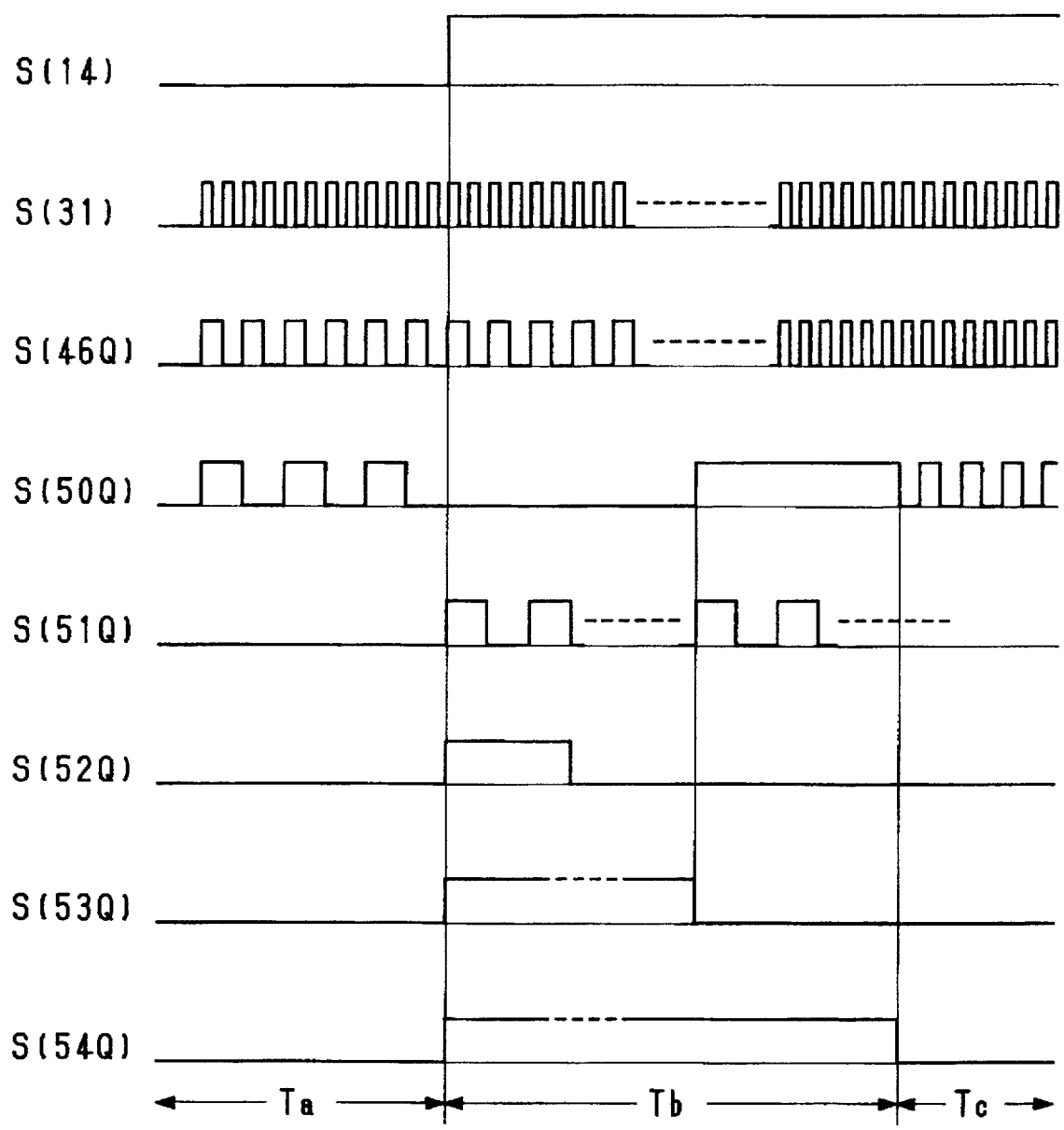
Figure 8:
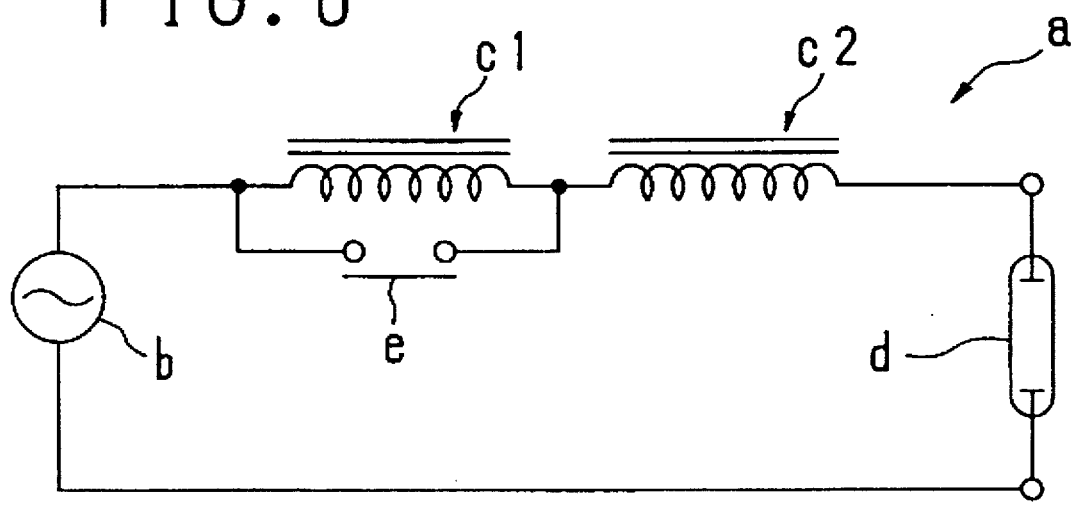
FIG. 8 is a circuit diagram for explaining the conventional problem.

FIGS. 6 and 7 illustrate a lighting circuit 1A according to the second embodiment of this invention. The second embodiment differs from the first embodiment in that the polarity of the DC voltage is inverted in the polarity-inversion restricting period Tb, and is mostly the same as the first embodiment in other sections. To avoid the redundant description, therefore, like or same reference numbers as used for the first embodiment will be used to denote corresponding or identical components in the second embodiment.

FIG. 6 shows the structure of a frequency controller 7c which is comprised of six D type flip-flops and several logic gates.

The clock signal from the oscillator 31 is sent to the clock input terminal (CK) of a flip-flop 46 at the first stage, and to one input terminal of a two-input AND gate 47. The output signal of a flip-flop 54 (which will be discussed later) is input to the other input terminal of the AND gate 47 whose output signal is sent to the set terminal (S) of the flip-flop 46.

The flip-flop 46 has its D terminal (D) connected to its /Q output terminal. The Q output of the flip-flop 46 is sent to the clock input terminal (CK) of a flip-flop 50 at the subsequent stage via a two-input AND gate 48 and an two-input OR gate 49, and is sent to the clock input terminal (CK) of a first-stage flip-flop 51 among four-stage flip-flops 51, 52, 53 and 54 which constitute a counter section.

Each of the flip-flops 51 to 54 has a D input terminal (D) connected to its /Q output terminal and has a set terminal (S) supplied with the output signal S(14) of the lighting detector 14 via a NOT gate 55. The Q output of the flip-flop 51 is sent to the clock input terminal (CK) of the flip-flop 52 whose Q output is sent to one input terminal of a two-input AND gate 56. The AND gate 56 also receives the Q output of the flip-flop 54 at the other input terminal and acquires the AND signal of those Q outputs. This AND signal is sent to the clock input terminal (CK) of the flip-flop 53.

The flip-flop 53 sends its /Q output to the remaining input terminal of the OR gate 49, and sends its Q output to the clock input terminal (CK) of the flip-flop 54.

The flip-flop 54 sends its Q output to the remaining input terminal of the AND gate 56, and sends its /Q output to the reset terminal (R) of the flip-flop 46, the aforementioned input terminal of the AND gate 47 and one input terminal of a two-input OR gate 57.

The output signal S(14) of the lighting detector 14 is input via the NOT gate 55 to the other input terminal of the OR gate 57 whose output is sent to the remaining input terminal of the AND gate 48.

The Q output of the flip-flop 50 (which is denoted by "S(50Q)") is sent to the FET 28(3) via the buffer 40 and FET 41, and is sent to the FET 28(2) via the NOT gate 42. The /Q output of the flip-flop 50 (which is denoted by "S(50Q*)") is sent to the FET 28(1) via the buffer 43 and FET 44, and is sent to the FET 28(4) via the NOT gate 45.

A predetermined voltage is supplied to the set terminal (S) of the flip-flop 50, and the reset terminals of the flip-flops 50 to 54 are all grounded.

FIG. 7 presents a time chart for explaining the operations of the individual sections of the frequency controller 7c. In the diagram, "S(46Q)", "S(50Q)", "S(51Q)", "S(52Q)", "S(53Q)" and "S(54Q)" respectively represent the Q outputs of the flip-flops 46, 50, 51, 52, 53 and 54 "Ta", "Tb", "Tc", "S(14)" and "S(31)" are the same as those mentioned above.

In the pre-lighting period Ta, the clock signal S(31) from the oscillator 31 is frequency-divided by the flip-flop 46 and is further frequency-divided by the flip-flop 50 at the subsequent stage. As a result, the basic frequency of the output signal of the flip-flop 50 becomes fo/4. The output signal S(14) of the lighting detector 14 is an L-level signal which is inverted by the NOT gate 55. As the inverted signal is supplied to the set terminals (S) of the flip-flops 51–54, those flip-flops do not function. As the output of the AND gate 47 has an L level and the output of the OR gate 57 has an H level, the Q output of the flip-flop 46 passes through the AND gate 48. As the /Q output of the flip-flop 53 has an L level, the Q output of the flip-flop 46 likewise passes through the OR gate 49.

In the next polarity-inversion restricting period Tb, when the discharge lamp 10 is lighted, the output signal S(14) of the lighting detector 14 becomes an H level. The inverted signal of this H-level signal is supplied to the set terminals (S) of the flip-flops 50–54 so that those flip-flops start the frequency-dividing operation.

Although the clock signal S(31) from the oscillator 31 is frequency-divided by the flip-flop 46, the output of the OR gate 57 becomes an L level until the Q output of the flip-flop 54 becomes an H level. Therefore, the output of the AND gate 48 becomes an L level regardless of the Q output of the flip-flop 46, disabling the flip-flop 50.

As the time passes and the level of the /Q output of the flip-flop 53 is inverted to the H level from the L level, this /Q output is sent via the OR gate 49 to the clock input terminal of the flip-flop 50, the output of the flip-flop 50 is inverted. This state continues until the output of the flip-flop 54 is inverted. In other words, the polarity of the AC voltage in the period (=2^3/fo) from the beginning of the polarity-inversion restricting period Tb to the point of the inversion of the output of the flip-flop 53 is opposite to the one in the subsequent period (=2^3/fo) until the output of the flip-flop 54 is inverted.

In the subsequent restriction release period Tc, the inversion of the output of the flip-flop 54 causes the Q output to be sent to the clock input terminal of the flip-flop 53 via the AND gate 56, disabling the flip-flops 53 and 54, and this state is maintained. As the /Q output of the flip-flop 54 is sent to the set terminal of the flip-flop 46 via the AND gate 47, the clock signal S(31) passes through the flip-flop 46 and is frequency divided by the flip-flop 50. Consequently, the basic frequency of the output signal of the flip-flop 50 becomes fo/2, which is higher than the frequency in the pre-lighting period Ta.

According to the second embodiment, as described above, the basic frequency of the rectangular wave output from the DC-AC converter 7 in the restriction release period Tc is higher than that in the pre-lighting period Ta, and stable lighting is accomplished by inverting the polarity of the AC voltage once in the polarity-inversion restricting period Tb which is intervened between both periods Ta and Tc. In other words, the execution of DC lighting for both polarities by performing a single polarity inversion in the polarity-inversion restricting period Tb can ensure smooth transition to the stage of supplying a rectangular-wave voltage with a high frequency to the discharge lamp 10 after the discharge lamp 10 comes out of the unstable lighting stage.

Although a single polarity inversion is performed in the polarity-inversion restricting period Tb in the second embodiment, the polarity inversion may be executed more than once, or the inverting period may be gradually shortened to accomplish the continuous transition to the cycle in the restriction release period Tc, as long as the frequency associated with polarity inversion in the polarity-inversion restricting period Tb is set sufficiently lower than the frequency in the pre-lighting period Ta (the frequency in the polarity-inversion restricting period Tb can be considered as zero in the control of the first embodiment).

In short, according to this invention, frequency control is performed in such a manner that the frequency of the output voltage of the DC-AC converting means becomes low in the non-lighting period of a discharge lamp while the frequency of the output voltage of the DC-AC converting means becomes high in the period after the lighting of the discharge lamp. Accordingly, the time for the flux of light from the discharge lamp to rise is shortened, and the inversion of the polarity of the output voltage of the DC-AC converting means is restricted in the transitional period between the non-lighting period and the period after the lighting of the discharge lamp or the period from the point of lighting of the discharge lamp to the point when a predetermined time passes. It is therefore possible to prevent the lighting state of the discharge lamp from becoming unstable due to a drastic change in frequency and thus prevent the lighting of the discharge lamp from failing.

What is claimed is:

1. A lighting circuit for a discharge lamp having DC-AC converting means for converting a DC voltage to an AC voltage which is to be supplied to said discharge lamp via an inductive load, said lighting circuit comprising:

lighting detection means for detecting if said discharge lamp is lighted; and frequency control means for, upon reception of a signal from said lighting detector, setting a frequency of an output voltage of said DC-AC converting means after activation of said discharge lamp higher than a frequency of said output voltage of said DC-AC converting means in a non-lighting period of said discharge lamp, and restricting inversion of a polarity of said output voltage of said DC-AC converting means until a predetermined time passes after a point of activation of said discharge lamp.

2. The lighting circuit according to claim 1, wherein said frequency control means executes polarity inversion at a lower frequency than said frequency of said output voltage of said DC-AC converting means in said non-lighting period of said discharge lamp during a period from a point of activation of said discharge lamp to passage of said predetermined time.

3. The lighting circuit according to claim 1, wherein said frequency control means generates different control signals in a first period in which said discharge lamp is lighted from beginning of activation of said discharge lamp, a second period from a point of lighting of said discharge lamp to a point of passage of a predetermined time and a third period subsequent to said second period.

4. The lighting circuit according to claim 2, wherein said frequency control means generates different control signals in a first period in which said discharge lamp is lighted from beginning of activation of said discharge lamp, a second period from a point of lighting of said discharge lamp to a point of passage of a predetermined time and a third period subsequent to said second period.

5. The lighting circuit according to claim 3, wherein said frequency control means generates a rectangular-wave signal with a low frequency in said first period, then generates a DC signal with a predetermined polarity in said second period, and generates and a rectangular-wave signal with a high frequency in said third period.

6. The lighting circuit according to claim 4, wherein said frequency control means generates a rectangular-wave signal with a low frequency in said first period, then generates a DC signal with a predetermined polarity in said second period, and generates and a rectangular-wave signal with a high frequency in said third period.

7. The lighting circuit according to claim 1, wherein said frequency control means comprises an oscillator for generating a clock signal with a basic frequency, and a frequency divider for frequency-dividing said clock signal from said oscillator.

8. The lighting circuit according to claim 2, wherein said frequency control means comprises an oscillator for generating a clock signal with a basic frequency, and a frequency divider for frequency-dividing said clock signal from said oscillator.

9. The lighting circuit according to claim 3, wherein said frequency control means comprises an oscillator for generating a clock signal with a basic frequency, and a frequency divider for frequency-dividing said clock signal from said oscillator.

10. The lighting circuit according to claim 4, wherein said frequency control means comprises an oscillator for generating a clock signal with a basic frequency, and a frequency divider for frequency-dividing said clock signal from said oscillator.

11. The lighting circuit according to claim 7, wherein said oscillator has a structure of an astable multivibrator.

12. The lighting circuit according to claim 8, wherein said oscillator has a structure of an astable multivibrator.

13. The lighting circuit according to claim 9, wherein said oscillator has a structure of an astable multivibrator.

14. The lighting circuit according to claim 10, wherein said oscillator has a structure of an astable multivibrator.

15. The lighting circuit according to claim 7, wherein said frequency divider has a counter, two D type flip-flops and a plurality of logic gates.

16. The lighting circuit according to claim 8, wherein said frequency divider has a counter, two D type flip-flops and a plurality of logic gates.

17. The lighting circuit according to claim 9, wherein said frequency divider has a counter, two D type flip-flops and a plurality of logic gates.

18. The lighting circuit according to claim 10, wherein said frequency divider has a counter, two D type flip-flops and a plurality of logic gates.

19. The lighting circuit as set forth in claim 1 wherein said detection means comprises a photo sensor for directly detecting the lighting of said lamp and a circuit responsive to the output of said photo sensor.

20. A lighting circuit for a discharge lamp having DC-AC converting means for converting a DC voltage to an AC voltage which is to be supplied to said discharge lamp via an inductive load, said lighting circuit comprising:

a lighting detector circuit for detecting whether said discharge lamp is lighted; and a frequency control circuit operative upon reception of a signal from said lighting detector to set a frequency of an output voltage of said DC-AC converting means after activation of said discharge lamp higher than a frequency of said output voltage of said DC-AC converting means in a non-lighting period of said discharge lamp, and causing inversion of a polarity of said output voltage of said DC-AC converting means a predetermined number of times during a predetermined period after a point of activation of said discharge lamp.

* * * * *